United States Patent
Heruska et al.

(10) Patent No.: US 8,668,190 B1
(45) Date of Patent: Mar. 11, 2014

(54) IMPACT ABSORBING TELESCOPING POST FOR MULTI-PANEL TRAMPOLINES

(75) Inventors: Richard Thomas Heruska, Tampa, FL (US); Stephen Eric Johnston, II, Tampa, FL (US)

(73) Assignee: Vertical Venture Holdings, LLC, Tampa, FL (US)

( * ) Notice: Subject to any disclaimer, the term of this patent is extended or adjusted under 35 U.S.C. 154(b) by 320 days.

(21) Appl. No.: 13/209,053

(22) Filed: Aug. 12, 2011

(51) Int. Cl.
*F16F 1/00* (2006.01)

(52) U.S. Cl.
USPC ........... 267/182; 267/136; 188/372; 188/380; 248/548; 248/600; 482/83; 472/135

(58) Field of Classification Search
USPC .......... 267/136, 139, 182; 188/371, 372, 380; 248/548, 157, 599, 600, 161; 293/132, 293/135, 136, 137; 472/135; 482/83
See application file for complete search history.

(56) References Cited

U.S. PATENT DOCUMENTS

| 952,871 | A | * | 3/1910 | Browder | 182/139 |
|---|---|---|---|---|---|
| 2,107,561 | A | * | 2/1938 | Brandt et al. | 297/209 |
| 2,142,328 | A | * | 1/1939 | Mutter | 293/8 |
| 3,365,194 | A | * | 1/1968 | Strickland, Jr. | 482/33 |
| 3,635,471 | A | * | 1/1972 | Caron | 482/4 |
| 3,756,643 | A | * | 9/1973 | Weed | 293/134 |
| 4,143,898 | A | * | 3/1979 | Klaus et al. | 293/137 |
| 4,386,772 | A | * | 6/1983 | Wu | 482/28 |
| 4,624,493 | A | * | 11/1986 | Hillebrand et al. | 293/136 |
| 4,736,983 | A | * | 4/1988 | Furbee | 297/209 |
| 4,997,232 | A | * | 3/1991 | Johnsen | 297/209 |
| 5,087,037 | A | * | 2/1992 | Morrow | 482/33 |
| 5,387,166 | A | * | 2/1995 | Gvoich | 482/52 |
| 6,598,365 | B2 | * | 7/2003 | Abraham et al. | 52/403.1 |
| 6,733,420 | B1 | * | 5/2004 | Schroeder | 482/27 |
| 8,182,401 | B2 | * | 5/2012 | Clemons | 482/83 |
| 2008/0090704 | A1 | * | 4/2008 | Denis et al. | 482/28 |

\* cited by examiner

*Primary Examiner* — Thomas J Williams
*Assistant Examiner* — Mariano Sy
(74) *Attorney, Agent, or Firm* — Ronald E. Smith; Smith & Hopen, P.A.

(57) ABSTRACT

An impact-absorbing structure includes a vertical hollow column that telescopically receives a post. A coil spring surmounts a centrally apertured support plate that receives and is secured to the hollow column. A coil spring stands atop the support plate and the upper end of the coil spring is secured to a top plate that surmounts the post. A centrally apertured spacer plate is parallel to the top plate and is downwardly spaced apart from it. A plurality of bolts interconnects the top plate and spacer plate. The post retracts within the hollow column and the coil spring is compressed when a downwardly directed force is applied to the top plate. The coil spring unloads and restores the top plate and the spacer plate to their respective positions of repose when the downwardly directed force is removed. Each bolt is engaged by an eye loop at the end of a cable.

5 Claims, 9 Drawing Sheets

IMPACT ABSORBING TELESCOPING POST FOR MULTI-PANEL TRAMPOLINES

BACKGROUND OF THE INVENTION

1. Field of the Invention

This invention relates, generally, to trampolines. More particularly, it relates to an impact-absorbing structure having utility in multi-panel trampolines.

2. Description of the Prior Art

Multi-panel trampolines are formed by interlocking a plurality of single trampoline panels together. In this way, very large trampolines can be assembled for simultaneous use by large numbers of people.

When such a trampoline is built, problems arise at the corners where four (4) panels meet. These intersections are problematic because two (2) cables intersect each other at right angles as such intersections. The cables rub against one another and thus shorten their useful lifetimes.

In view of the art considered as a whole at the time the present invention was made, it was not obvious to those of ordinary skill in the art how the structure of multi-panel trampolines could be improved.

SUMMARY OF THE INVENTION

The long-standing but heretofore unfulfilled need for a device that overcomes the cable-rubbing problem is now met by a new, useful, and non-obvious invention.

The novel impact absorbing telescoping post includes a vertical hollow column; and a post that is in axial alignment with the hollow column. The post has an external diameter slightly less than an internal diameter of the hollow column and is telescopically received within a hollow interior of the hollow column.

A coil support plate is secured to the hollow column in surmounting relation thereto. A coil spring is disposed in surmounting relation to the support plate. A top plate is secured to the post in surmounting relation thereto. An upper end of the coil spring is secured to the top plate. A centrally apertured spacer plate is disposed parallel to the top plate and spaced downwardly therefrom.

A plurality of bolts is disposed in interconnecting relation to the top plate and the spacer plate. A plurality of nuts underlies and abuts an under side of the top plate and a plurality of nuts overlies and abuts the upper side of the spacer plate to maintain the spacing between the top and spacer plates. Application of a downwardly directed force to the top plate therefore causes the post to retract within the hollow column, compressing the coil spring. The top plate and spacer plate maintain their spacing from one another and travel conjointly with the post as it retracts. The coil spring restores the top plate and the spacer plate to their respective positions of repose when the downwardly directed force is removed.

Each cable of a plurality of cables, disposed at ninety degree (90°) intervals, has an eye loop formed in its radially innermost end. Each of the eye loops is engaged to an associated bolt of the plurality of bolts and each of said the loops is free to travel along the extent of its associated bolt.

An important object of the invention is to provide a structure that makes the intersection of trampoline panels in multi-panel structures more durable.

A closely related object is to accomplish the foregoing object by providing an impact-absorbing post at each intersection of multiple trampoline panels.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which.

DETAILED DESCRIPTION OF THE PREFERRED EMBODIMENT

Figure 1:
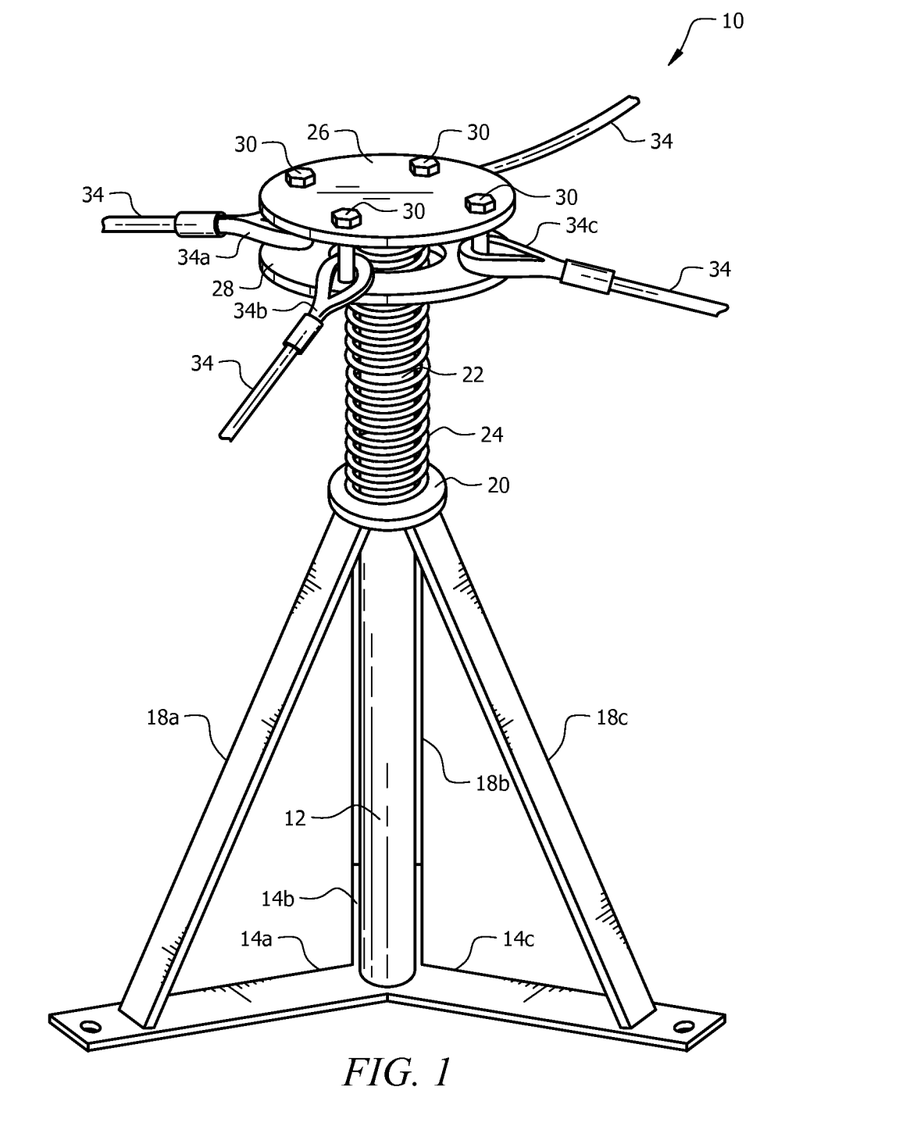
FIG. 1 is a perspective view of the novel impact-absorbing post when in repose.

FIG. 1 depicts an illustrative embodiment of the novel structure which is denoted as a whole by the reference numeral 10.

Novel structure 10 includes vertical hollow column 12 that may be maintained in said vertical orientation by any suitable means. In the depicted embodiment, hollow column 12 is supported by base 14 that includes three (3) radially disposed arms 14a, 14b and 14c that overlie support surface 16 (FIGS. 9 and 10) and three (3) braces 18a, 18b and 18c that interconnect the respective radially outermost ends of said arms to spring support plate 20.

Post 22 which may be hollow or solid is of telescopic construction and is in axial alignment with hollow column 12. Post 22 has an external diameter slightly less than an internal diameter of said hollow column and is received therewithin.

Coil spring 24 surmounts support plate 20. The upper end of coil spring 24 is secured to top plate 26 that surmounts post 22 and said upper end of said coil spring is welded or otherwise secured to said top plate.

Centrally apertured spacer plate 28 is parallel to top plate 26 and spaced downwardly therefrom as depicted. A plurality of bolts, collectively denoted 30, interconnects top plate 26 and spacer plate 28. An equal number of nuts not shown in the figure underlies and abuts the under side of top plate 26 and the same number of nuts not shown in the figure overlies and abuts the upper side of spacer plate 28 to maintain the spacing between said top and spacer plates.

Figure 2:
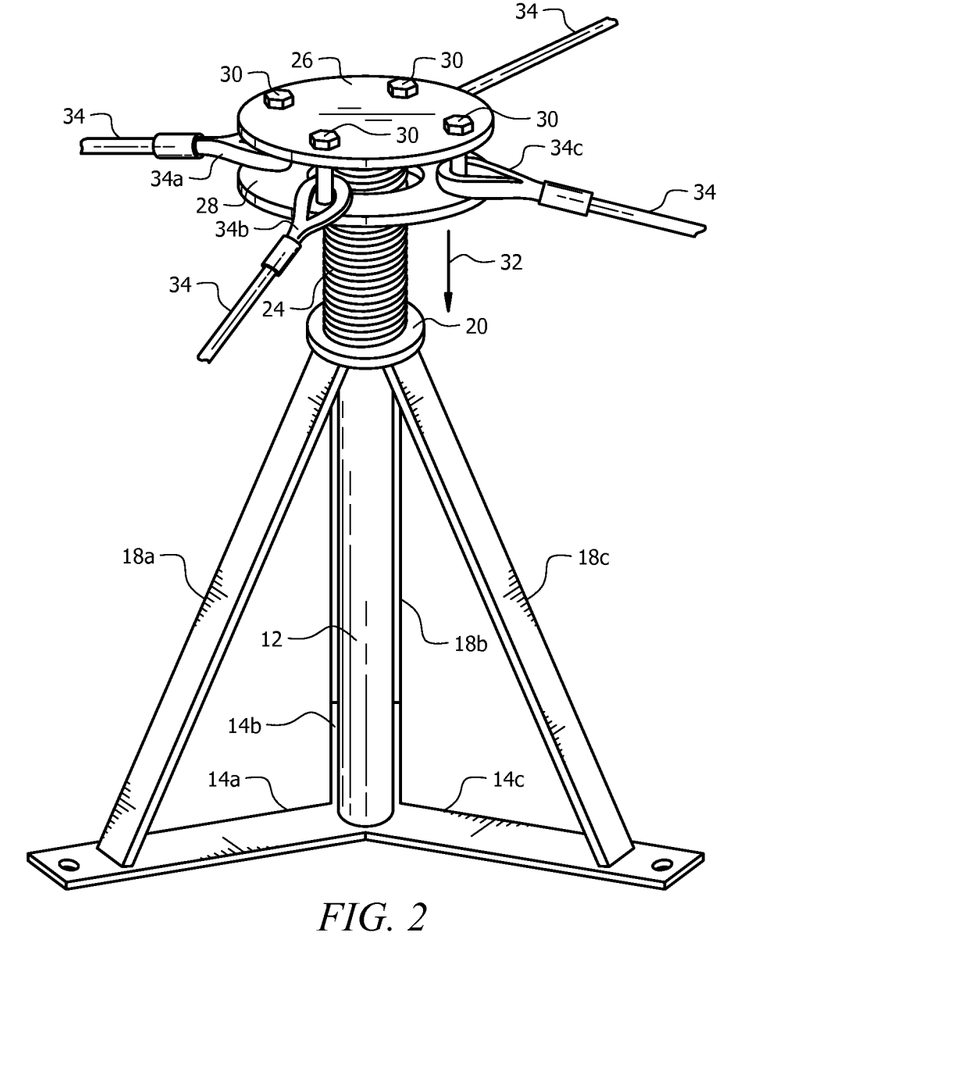
FIG. 2 is a view like FIG. 1 but depicting the post when under compression.
Figure 3:
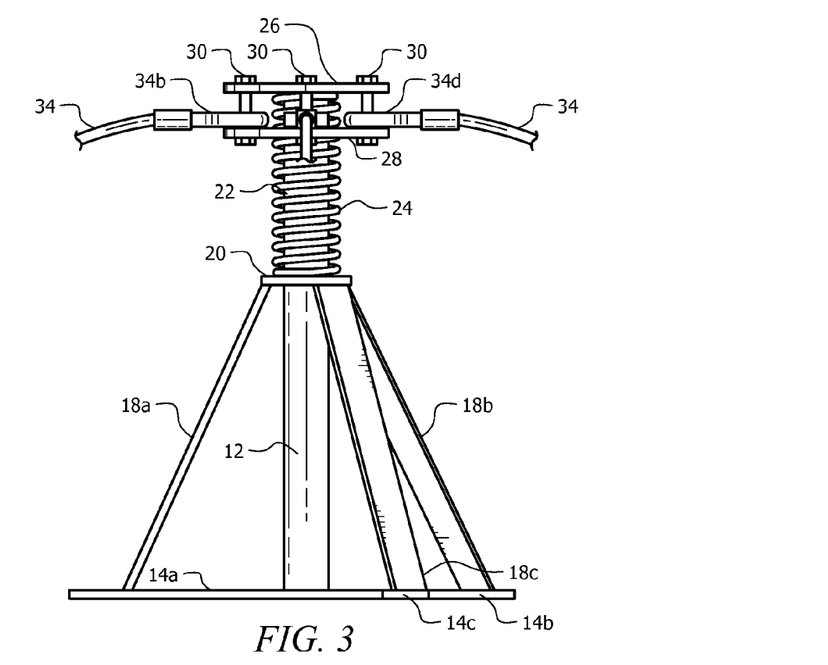
FIG. 3 is a side elevational view of the apparatus depicted in FIG. 1.
Figure 4:
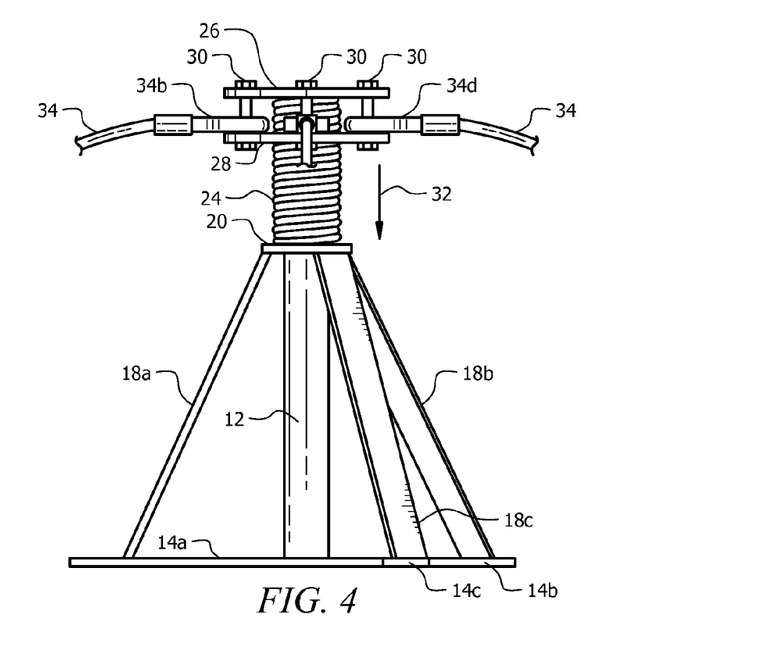
FIG. 4 is a side elevational view of the apparatus depicted in FIG. 2.

When a downwardly directed force is applied to top plate 26, as indicated by directional arrow 32 in FIG. 2, post 22 retracts within hollow column 12 and coil spring 24 is compressed, resisting such retraction. Top plate 26 and spacer plate 28 maintain their spacing from one another and travel conjointly with said post 22 as it retracts. Coil support plate 20 is secured to hollow column 12 and therefore is not displaced by said downward force. When downwardly directed force 32 is removed, coil spring 24 unloads and restores top plate 26 and spacer plate 28 to their respective positions of repose as depicted in FIG. 1.

Four (4) cables, collectively denoted 34, disposed at ninety degree (90°) intervals, have eye loops 34a-d, respectively, and each eye loop engages an associated bolt 30 of said plurality of bolts. The eye loops are free to travel along the extent of said bolts.

Figure 5:
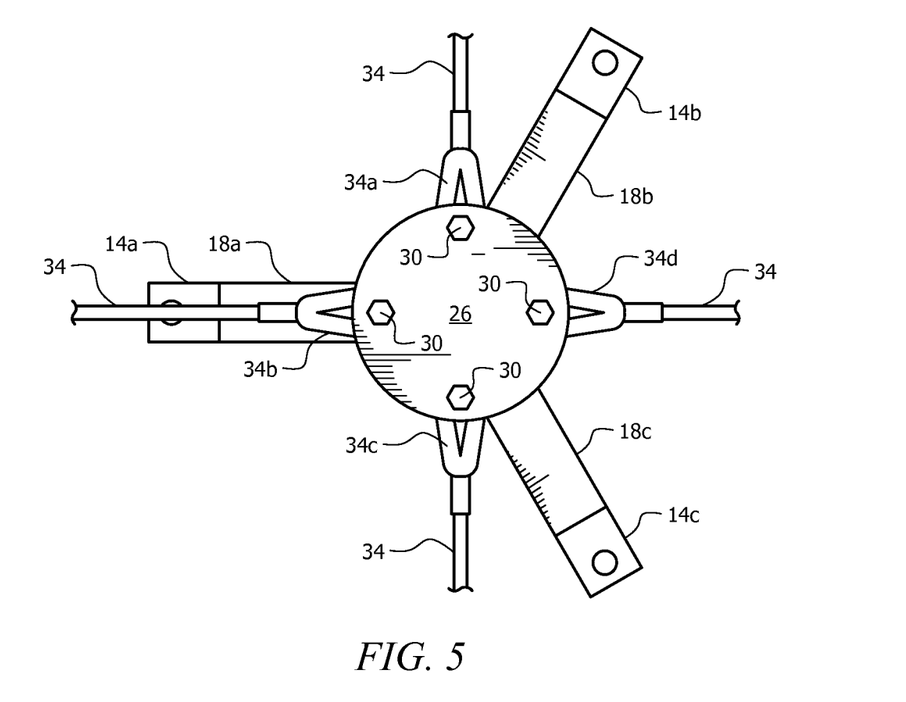
FIG. 5 is a top plan view of the novel post.

FIG. 5 provides a top view. The spacing of support arms 14a-c and braces 18a-c at one hundred twenty degree (120°) intervals is preferred but is not critical.

Figure 6:
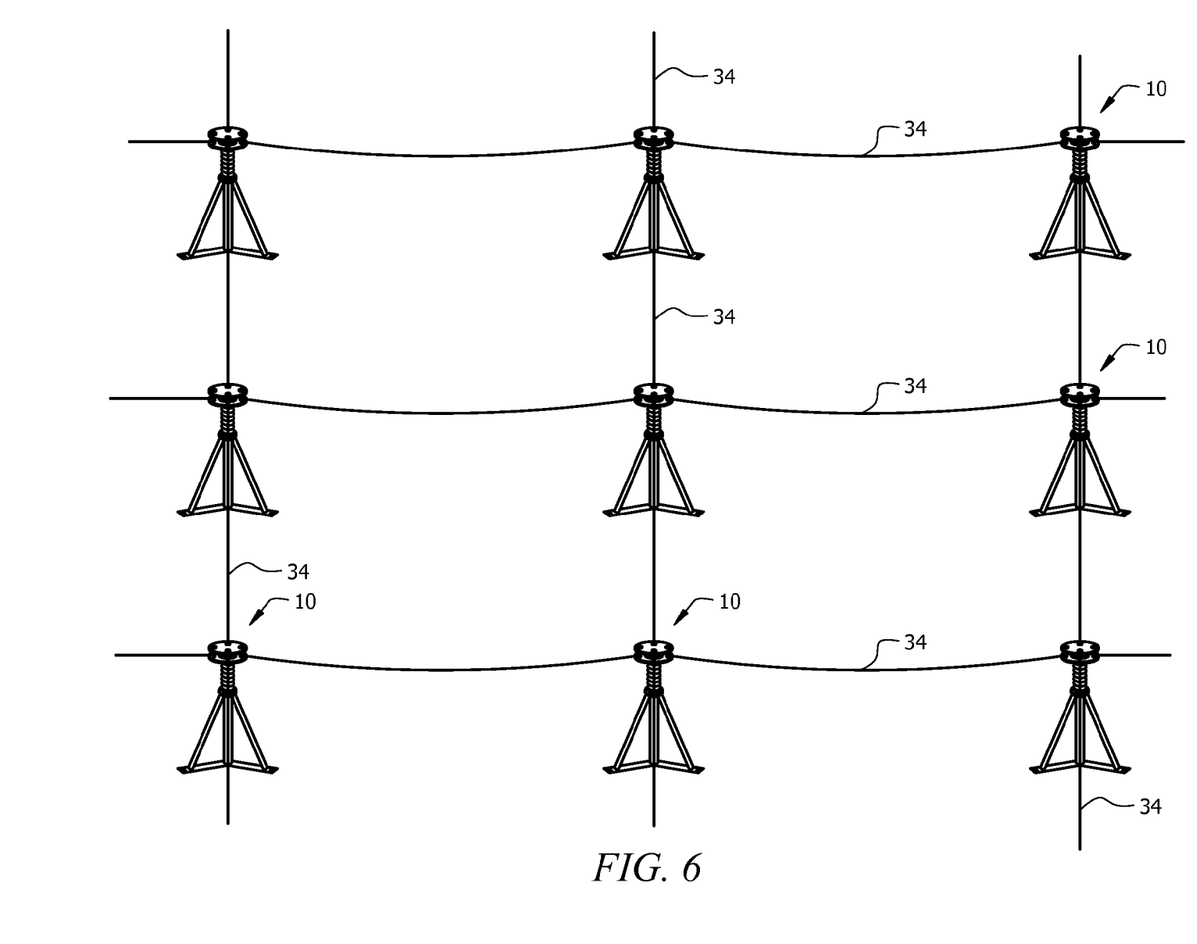
FIG. 6 is a perspective view depicting a plurality of the novel posts when arrayed to form a multi-panel trampoline.

An array of cables 34 interconnected at each intersection by a novel post 10 is depicted in FIG. 6. No cables rub or intersect one another. The trampoline panels held by said cables are not depicted in FIG. 6.

Figure 7:
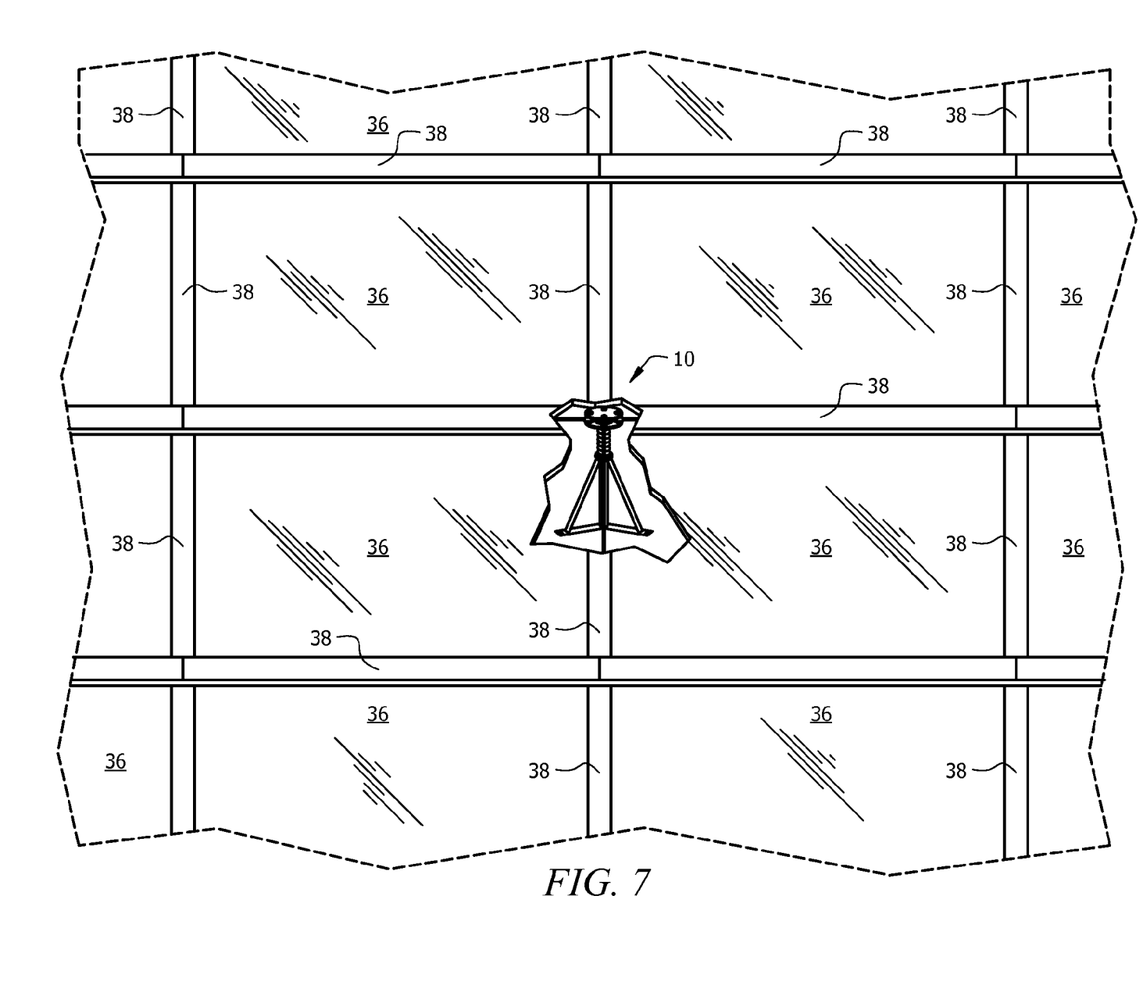
FIG. 7 is a perspective view of a multi-panel trampoline with a cut-away depicting one of the novel posts positioned at an intersection of four panels.
Figure 8:
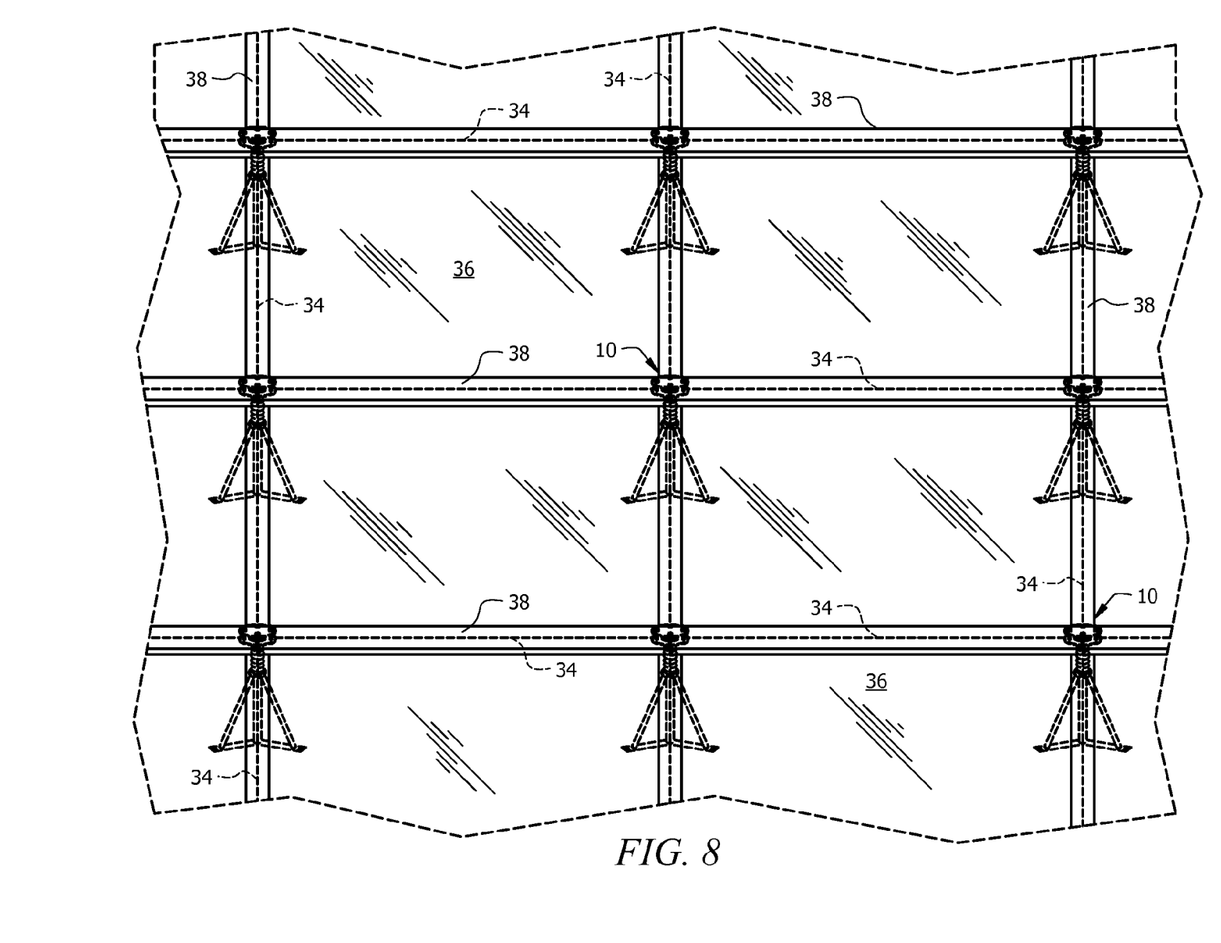
FIG. 8 is a perspective view like that of FIG. 7 but depicting a post at each intersection of four panels.

A plurality of trampoline panels, collectively denoted 36, is depicted in FIG. 7. Each panel has a hem 38 at its four (4) borders and each hem receives a cable 34. Cables 34 within each hem 38 are depicted in FIG. 8.

Figure 9:
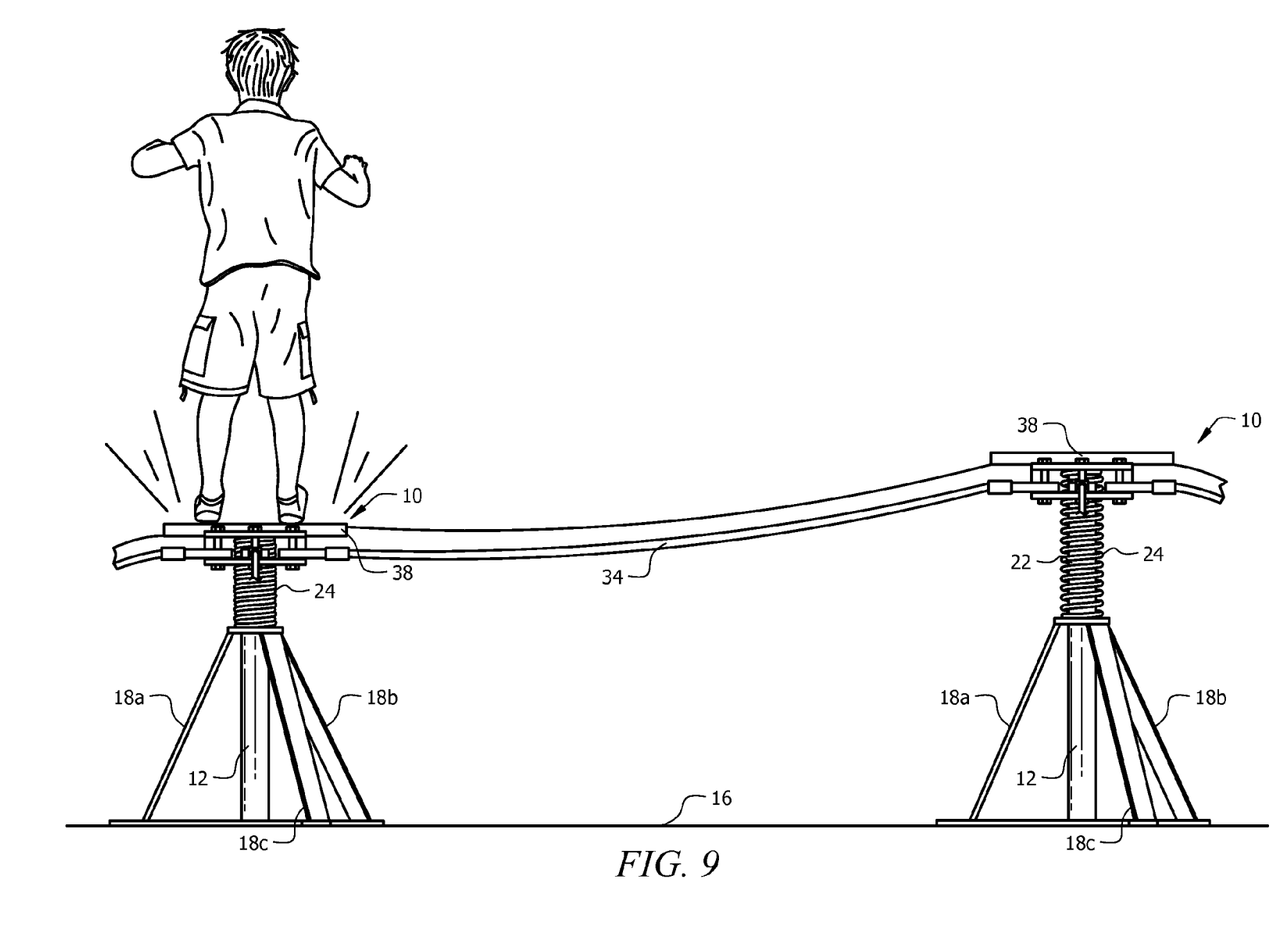
FIG. 9 is a side elevational view depicting a user positioned directly atop an intersection of panels.
Figure 10:
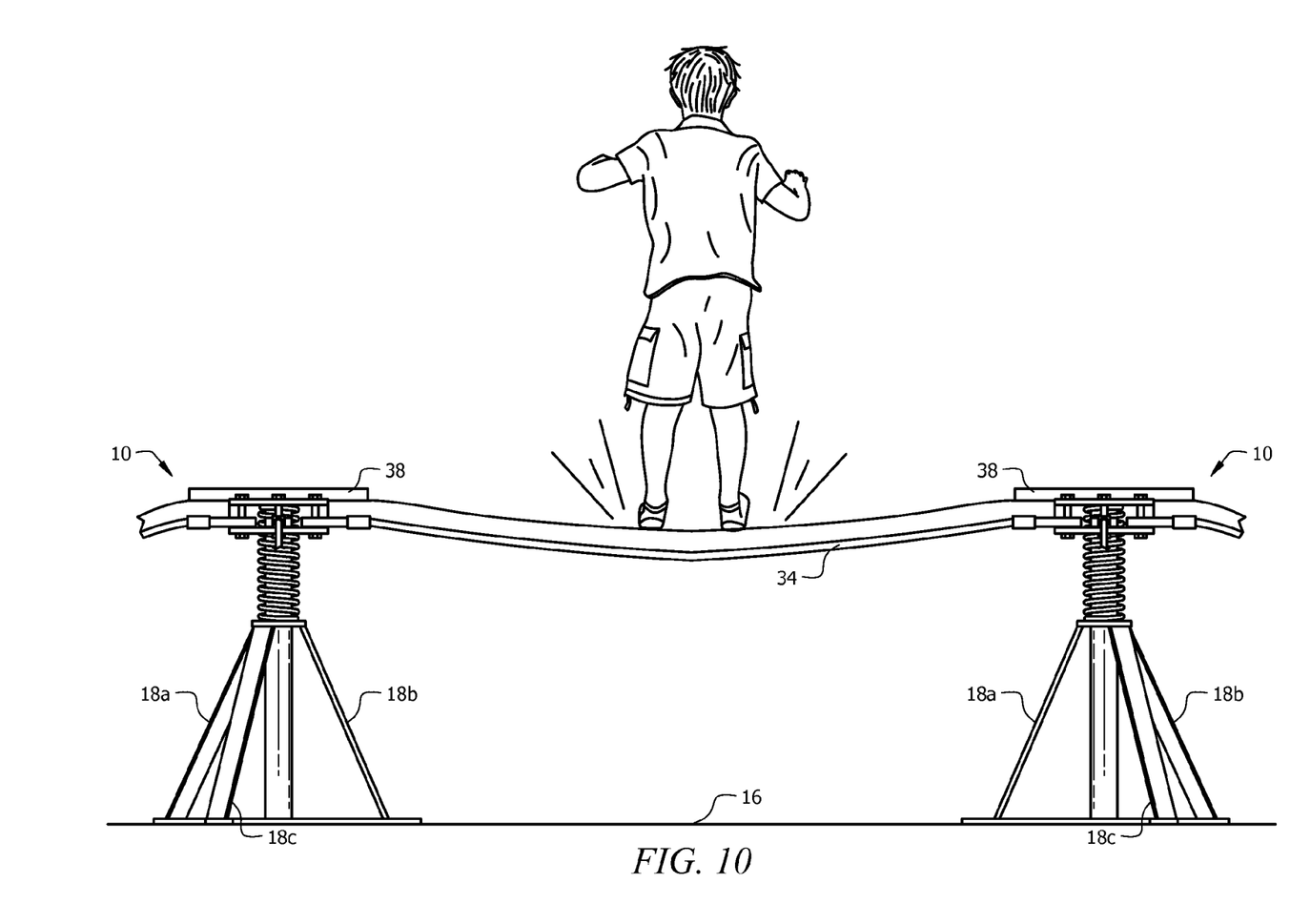
FIG. 10 is a view like that of FIG. 9 but depicting a user positioned between the novel posts.

FIGS. 9 and 10 depicted the novel structure when a post 10 is subjected to a direct and an indirect downward force, respectively.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An impact absorbing telescoping post, comprising:
a vertical hollow column;
a post in axial alignment with said hollow column, said post having an external diameter slightly less than an internal diameter of said hollow column and being telescopically received within a hollow interior of said hollow column;
a coil support plate secured to said hollow column in surmounting relation thereto;
a coil spring disposed in surmounting relation to said coil support plate;
a top plate secured to said post in surmounting relation thereto;
an upper end of said coil spring secured to said top plate;
a centrally apertured spacer plate disposed parallel to said top plate and spaced downwardly therefrom;
a plurality of bolts disposed in interconnecting relation to said top plate and said spacer plate;
whereby application of a downwardly directed force to said top plate causes said post to retract within said hollow column, compressing said coil spring;
whereby said top plate and spacer plate maintain their spacing from one another and travel conjointly with said post as said post retracts; and
whereby said coil spring restores said top plate and said spacer plate to their respective positions of repose when said downwardly directed force is removed.

2. The apparatus of claim 1, further comprising:
a plurality of cables, disposed at ninety degree (90°) intervals, each having an eye loop formed in a radially innermost end;
each of said eye loops engaged to an associated bolt of said plurality of bolts.

3. The post of claim 1, further comprising:
a base maintaining said hollow column in a vertical orientation;
said base including a plurality of radially disposed arms that overlie a support surface and a plurality of braces that interconnect the respective radially outermost ends of said arms to said coil support plate.

4. The post of claim 1, further comprising:
a plurality of nuts underlying and abutting an under side of said top plate and a plurality of nuts overlying and abutting the upper side of said spacer plate to maintain the spacing between said top and spacer plates.

5. The post of claim 2, further comprising:
a plurality of trampoline panels, each of which has a hem formed in a peripheral border thereof;
each of said hems occupied by a cable of said plurality of cables.

* * * * *